Patented Apr. 11, 1950

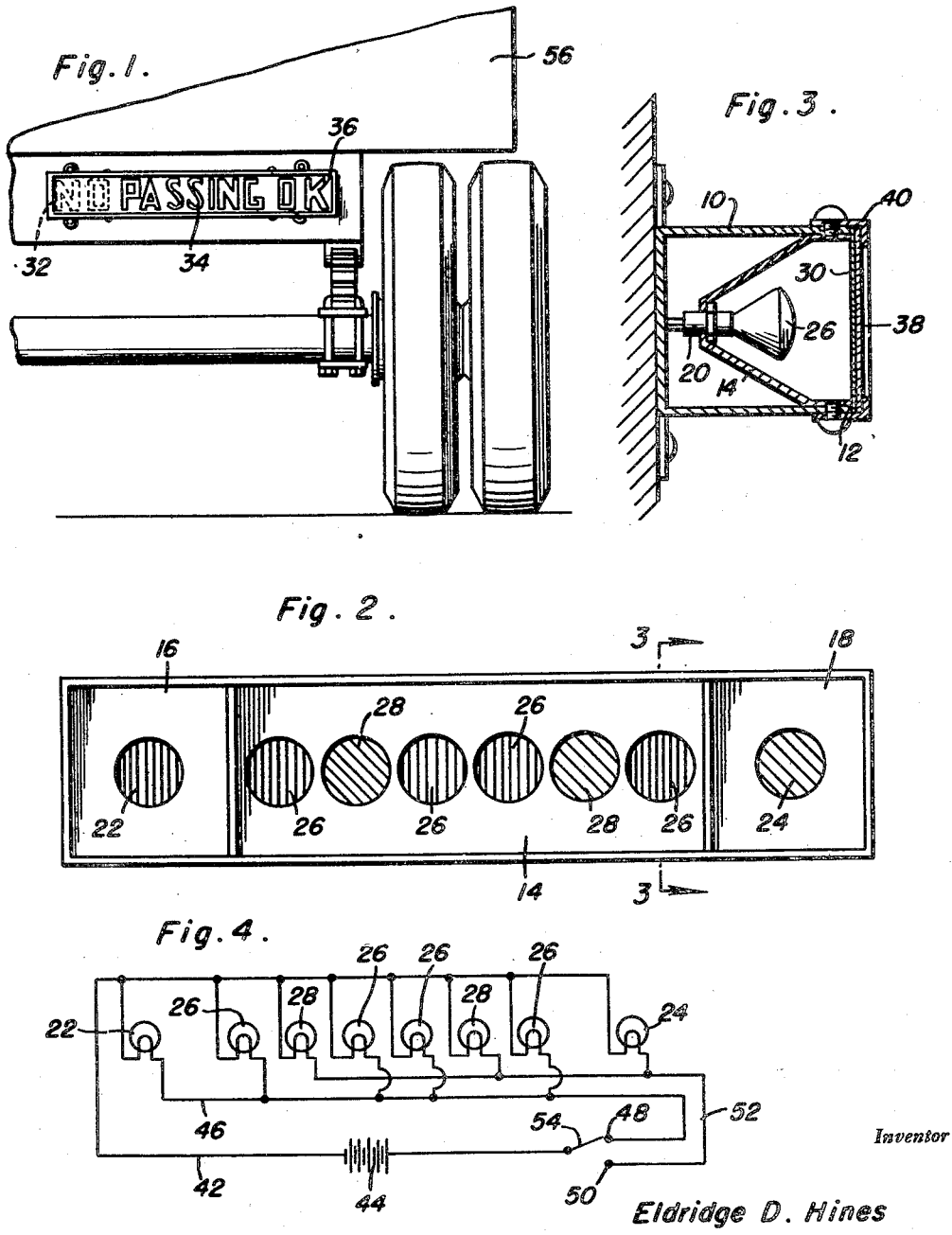

2,503,336

UNITED STATES PATENT OFFICE 2,503,336

TRAFFIC SIGNAL FOR VEHICLES

Eldridge D. Hines, Carlsbad, N. Mex.

Application January 8, 1948, Serial No. 1,175

1 Claim. (Cl. 177—327)

This invention relates to new and useful improvements in signal devices and the primary object of the present invention is to provide a traffic signal device applicable for vehicles in order to indicate to drivers approaching the rear of a vehicle whether or not they should pass the said vehicle.

Another important object of the present invention is to provide a signaling device which may be conveniently actuated by the driver of a truck or passenger car to indicate to trailing motorists when the road ahead is clear for passing or when the road is not clear for passing.

A further object of the present invention is to provide a traffic signal device including novel and improved means for illuminating the words No Passing by red colored light bulbs or the words Passing OK by green colored light bulbs.

A still further aim of the present invention is to provide a traffic signal for vehicles that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary rear elevational view of a truck and showing the present invention applied thereto;

Figure 2 is a rear elevational view of the present signal device showing the stencil plate removed therefrom;

Figure 3 is a transverse vertical sectional view taken substantially on the plane of section line 3—3 of Figure 2; and, Figure 4 is a diagrammatic view showing the wiring diagram used in the present invention.

Referring now to the drawings in detail, wherein for the purpose of illustration, there is disclosed a preferred embodiment of the present invention, the numeral 10 represents a substantially rectangular housing having an elongated opening 12 in its rear portion.

Removably fixed within the housing 10 is a main reflector compartment 14 and a pair of end compartments 16 and 18. A bulb supporting socket 20 is positioned in each of the end compartments 16 and 18, and a plurality of these sockets 20, longitudinally spaced, are positioned in the main compartment 14. A light bulb 22 of red colored material is positioned in the socket fixed in the end compartment 16 and a light bulb 24 of green colored material is positioned in the socket in the end compartment 18. Alternate light bulbs of red colored material 26 and green colored material 28 are positioned in the sockets in the main compartment 14.

Registering opposite the opening in the housing 10, is a stencil plate 30 having the letters NO indicated by the numeral 32 opposing the end compartment 16, the letters Passing indicated by the numeral 34 opposing the main compartment 14 and the letters OK indicated by the numeral 36 opposing the end compartment 18. A glass shield 38 frictionally bears against the outer face of the plate 30 and is retained relative to the housing 10 by a rectangular, channeled retaining strip 40 removably carried by the housing 10.

In practical use of the device, an electric line 42 leading from a suitable battery 44, is connected to each of the sockets 20. Connected to the sockets holding the red colored light bulbs 22 and 26 is an electric line 46 which is connected to a terminal 48. Leading from a further terminal 50, is an electric line 52 that is connected to the sockets holding the green colored bulbs 24 and 28. A switch 54 connected to the battery 44 is mounted in the driver's compartment of a truck 56 on which the housing 10 is fixed for selectively engaging the terminal 48 to illuminate the letters No Passing or the terminal 50 for illuminating the letters Passing OK.

In view of the foregoing description taken in conjunction with the accompanying drawings it is believed that a clear understanding of the device will be quite apparent to those skilled in this art. A more detailed description is accordingly deemed unnecessary.

Having described the invention, what is claimed as new is:

A traffic signalling device comprising a housing adapted to be secured at the rear of a vehicle, said housing having an opening in its rear wall, partitions dividing said housing into a plurality of compartments comprising a main central compartment and an end compartment at each end of said main compartment, an opaque stencil plate fixed to said housing in registry with the opening in said housing, said plate including the letters "Passing" opposing the main compartment, the letters "No" opposing one of the end compartments, and the letters "OK" opposing the other end compartments, illuminating means positioned in each of said compartments, and means controlled from the driver's compartment for illuminating said main compartment and a selected end compartment, said illuminating means including a colored light bulb of red material positioned in one of the end compartments opposing the letters No, a colored light bulb of green material positioned in the end compartment opposing the letters OK, and more than two alternate colored light bulbs of red and green material positioned in the main compartment opposing the letters Passing, said red bulbs in said compartments being simultaneously energized to illuminate the letters No Passing, and said green bulbs being simultaneously energized independently of said red bulbs to illuminate the letters Passing OK.

ELDRIDGE D. HINES.

REFERENCES CITED

The following references are of record in the file of this patent:

UNITED STATES PATENTS

| Number | Name | Date |
|---|---|---|
| 1,199,545 | Hammond | Sept. 16, 1916 |
| 1,554,570 | Gatchet | Sept. 22, 1925 |
| 1,854,699 | Johnson | Apr. 19, 1932 |
| 2,044,300 | Heans | June 16, 1936 |
| 2,083,102 | Slough | June 8, 1937 |
| 2,464,535 | Smith, Jr. | Mar. 15, 1949 |